Patented Dec. 19, 1950

2,534,370

UNITED STATES PATENT OFFICE 2,534,370

PRESERVATION OF LATEX

Chester E. Rhines, Glen Rock, and Chester E. Linscott, Ridgewood, N. J., assignors to United States Rubber Company, New York, N. Y., a corporation of New Jersey No Drawing. Application September 11, 1948, Serial No. 48,932

2 Claims. (Cl. 260—820)

This invention relates to improvements in methods of preserving natural rubber latex and the products thereof.

Natural rubber latex is commonly preserved today with ammonia. It is also known to preserve latex with formaldehyde, but such formaldehyde preserved latex thickens rapidly with age, and in a few months becomes too thick for direct use in manufacturing processes. The solid rubber derived from formaldehyde preserved latex, however, is much softer than the rubber derived from ammonia preserved latex, and this is desirable in many manufacturing processes. Rubber from ammonia preserved latex gives a Mooney viscosity of around 115 to 160, and rubber from formaldehyde preserved latex gives a Mooney viscosity of around 58 to 68, as measured by the Mooney shearing disc plastometer described by M. Mooney in Industrial and Engineering Chemistry, An. Ed. 6, 147 (1934). It is also known commercially to preserve latex by first adding a small amount of formaldehyde, allowing the latex to stand until there is no excess of formaldehyde, and then adding ammonia. This process again gives a high Mooney viscosity similarly to latex preserved solely with ammonia.

The object of the present invention is to obtain a formaldehyde preserved latex of maximum fluidity, and which will remain fluid over a long period of time. The terms "natural rubber latex" and "latex" are used herein to designate the latex of the *Hevea brasiliensis* tree.

According to the present invention, morpholine is first added to the fresh latex, after which the formaldehyde is added to the thus treated latex. Such volatile secondary amine does not react in the latex with the formaldehyde preservative as do ammonia or primary amines, and does not leave an undesirable solid residue in rubber recovered from the latex, as would alkali-metal hydroxides and alkali-metal salts.

In carrying out the present invention, the amount of formaldehyde for preservation of the latex may be from .1 to 1% based on the latex. The formaldehyde itself reduces the pH of freshly tapped latex from about 7 to a range of 5.5 to 6.8 depending on the amount of formaldehyde added. The amount of morpholine added in the present case should be such that the pH of the latex is not raised to above 8.5, the pH of the latex preserved according to the present invention generally being in the range 6 to 8.5. The amount of morpholine added will thus depend on the amount of formaldehyde to be used and will in general be from .1 to 1% based on the latex, and the lower the amount of formaldehyde to be used, the lower should be the amount of morpholine added. If the latex used is to be shipped as normal latex, the entire amount of morpholine being used may be added directly to the latex followed by the entire amount of formaldehyde for preservation. If the latex is to be concentrated before shipment, only a part of the total morpholine need be added to the fresh latex, followed by only a part of the formaldehyde, after which the latex may be concentrated and further amounts of morpholine and/or formaldehyde added to the concentrated latex as desired before storage or shipping. In this manner, less morpholine and/or formaldehyde is used, since an aliquot portion of that initially added to the latex is removed in the serum in the concentrating operation.

The following is illustrative of the present invention:

To a 38.4% total solids freshly tapped latex was added .2% of morpholine. All percentages in the examples are by weight and are based on the latex. After a 10 minute interval, .3% of formaldehyde was added. The pH of the latex dropped to 6.52 in 6 hours, at which time the latex was centrifuged, giving a 63.8% total solids cream. At the time of shipment, 9 hours later, .2% more of morpholine and .2% more of formaldehyde were added to the latex, giving a pH of 6.78. The viscosity of the latex at the time of shipment from the plantations to United States was 28 centipoises (cps.) at about 30° C. After 10 months from the time of shipment from the plantations, analysis again showed 63.8% total solids, a pH of 6.52, and a viscosity of only 58 cps. at 20° C. The latex had thus remained in fluid condition for 10 months, whereas similar latices preserved with similar amounts of formaldehyde alone, i. e. without the morpholine, would show a viscosity of around 200 cps. at 20° C. after 10 months.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of preserving natural Hevea rubber latex which comprises adding to fresh Hevea rubber latex 0.1 to 1% of morpholine based on the latex, and thereafter adding 0.1 to 1% formaldehyde based on the latex, the pH of the thus treated latex being in the range 6 to 8.5.

2. Natural Hevea rubber latex containing as preservative 0.1 to 1% each of morpholine and of formaldehyde, the pH of said latex being in the pH range 6 to 8.5.

CHESTER E. RHINES.
CHESTER E. LINSCOTT.

REFERENCES CITED

The following references are of record in the file of this patent:

UNITED STATES PATENTS

| Number | Name | Date |
|---|---|---|
| 1,872,161 | McGavack | Aug. 16, 1932 |
| 1,967,639 | Wedger | July 24, 1934 |
| 2,371,544 | Rhines | Mar. 13, 1945 |